US012573876B2

(12) United States Patent
Schwagmann et al.

(10) Patent No.: US 12,573,876 B2
(45) Date of Patent: Mar. 10, 2026

(54) ELECTRICAL PLUG CONNECTOR

(71) Applicant: Turck Holding GmbH, Halver (DE)

(72) Inventors: Hermann Schwagmann, Detmold (DE); Kevin Kreklow, Freiburg (DE); Dirk Mantei, Detmold (DE)

(73) Assignee: Turck Holding GmbH, Halver (DE)

( * ) Notice: Subject to any disclaimer, the term of this patent is extended or adjusted under 35 U.S.C. 154(b) by 252 days.

(21) Appl. No.: 18/021,881

(22) PCT Filed: Aug. 11, 2021

(86) PCT No.: PCT/EP2021/072418
§ 371 (c)(1),
(2) Date: Feb. 17, 2023

(87) PCT Pub. No.: WO2022/038018
PCT Pub. Date: Feb. 24, 2022

(65) Prior Publication Data
US 2023/0369888 A1    Nov. 16, 2023

(30) Foreign Application Priority Data
Aug. 19, 2020    (DE) .......................... 102020121752.8

(51) Int. Cl.
*H02J 13/12* (2026.01)
*G08B 21/18* (2006.01)
*H01R 13/66* (2006.01)

(52) U.S. Cl.
CPC ........... *H02J 13/12* (2026.01); *G08B 21/182* (2013.01); *H01R 13/6683* (2013.01); *H01R 13/6691* (2013.01)

(58) Field of Classification Search
None
See application file for complete search history.

(56) References Cited

U.S. PATENT DOCUMENTS

| | | | |
|---|---|---|---|
| 10,084,266 B1 | 9/2018 | Tsao et al. | |
| 10,191,088 B2 | 1/2019 | King et al. | |
| 2009/0207034 A1* | 8/2009 | Tinaphong | H02H 9/042 |
| | | | 340/635 |

(Continued)

FOREIGN PATENT DOCUMENTS

| | | |
|---|---|---|
| DE | 102018130509 | 6/2020 |
| WO | 2015149757 | 10/2015 |

(Continued)

*Primary Examiner* — John F Mortell
(74) *Attorney, Agent, or Firm* — Volpe Koenig

(57) ABSTRACT

An electrical plug connector (10) including a housing (12); at least one input-side contact (14, 16, 18); at least one output-side contact (20, 22, 24); and an electrical circuit (30) arranged inside the housing (12). The electrical circuit (30) has a sensor device (32), a control device (34) and a communication interface (38). The sensor device (32) is designed to detect an electrical operating parameter; and the control device (34) is designed to generate output data on the basis of the electrical operating parameter and to output said data by a communication interface (38). A method for operating a system having an electrical plug connector (10) is provided in which the plug connector (10) includes a sensor device (32) for detecting an electrical operating parameter.

19 Claims, 2 Drawing Sheets

(56) References Cited

U.S. PATENT DOCUMENTS

| 2011/0062780 A1* | 3/2011 | Verges ............. H02J 13/00001 |
| | | 307/38 |
| 2015/0348349 A1 | 12/2015 | de la Borbolla et al. |
| 2017/0160761 A1* | 6/2017 | Chan ......................... H02J 1/06 |
| 2017/0199229 A1 | 7/2017 | King et al. |
| 2018/0226755 A1 | 8/2018 | Davics et al. |
| 2018/0316223 A1* | 11/2018 | Wingrove ........... H02J 7/00304 |
| 2018/0351307 A1 | 12/2018 | AbuGalazaleh et al. |
| 2020/0243996 A1* | 7/2020 | Wittmann ............ H01R 13/533 |

FOREIGN PATENT DOCUMENTS

| WO | 2017180046 | 10/2017 |
| WO | 2020026057 | 2/2020 |

\* cited by examiner

ELECTRICAL PLUG CONNECTOR

CROSS-REFERENCE TO RELATED APPLICATIONS

This application is a 371 National Phase of PCT/EP2021/072418, filed Aug. 11, 2021, which claims priority from German Patent Application No. 10 2020 121 752.8, filed Aug. 19, 2020, both of which are incorporated herein by reference as if fully set forth.

TECHNICAL FIELD

The invention relates to an electrical plug connector. It further relates to a method for operating a system comprising an electrical plug connector, wherein the plug connector comprises sensor device for detecting one or more electrical operating parameters.

BACKGROUND

In many areas, such as manufacturing and automation technology, plug connectors are used to interconnect cables and other devices. A difficulty here can be ensuring that cables and connectors are functioning properly and quickly identifying damaged components if connection problems occur.

In known solutions, for example, a power supply with a display or other information option is provided, for example via a communication interface, wherein current power data are output based on the specification of voltage and current strength. Furthermore, diagnostic information can be generated for participating devices when undervoltages, overvoltages or voltage failure occur.

One of the problems that can be solved by the plug connector is a monitoring of the power supply by means of a cable connected to the plug connector, as well as the state of the cable.

SUMMARY

It is the object of the invention to provide an electrical plug connector with which a particularly reliable and efficient use of an established electrical connection or the connections of an existing distribution network can be ensured.

This object is achieved by a plug connector of the type mentioned at the outset having one or more of the features disclosed herein. Advantageous embodiments and developments of the invention are indicated below and in the claims.

The electrical plug connector comprises a housing, at least one input-side contact, at least one output-side contact, and an electrical circuit arranged within the housing. Here, the electrical circuit has a sensor device, a control device and a communication interface, wherein the sensor device is designed to detect an electrical operating parameter and the control device is designed to generate output data on the basis of the electrical operating parameter and to output said data by means of a communication interface.

The electrical circuit can comprise, for example, a power supply circuit, a sensor circuit, a microprocessor, and a telecommunications module-particularly a radio module.

During operation of an installation in which known embodiments of a plug connector are used, damage may occur to the supply lines, distributor components, for example Y-distributors, couplings or extensions, or to the electrical devices supplied. As a result, entire installation parts may fail and it is very laborious to determine at which point the connection was interrupted or damage has occurred. The installation is out of action for a correspondingly long time.

The electrical plug connector of the invention now allows the voltages and/or current strengths between the supply pins to be measured continuously at the various connection points of the supply line, for example directly at the pins of the plug connectors. Furthermore, the detected values can be communicated and/or stored for later output. This is done in the plug connector of the supply lines or with measuring points pre-installed for the purpose of commissioning, such as M12-to-M12 measuring bridges having the same characteristics as the plug connector described. For example, a measured voltage difference at different supply points can serve as information for evaluating the installation operation in further consideration.

For example, a detected voltage and/or current difference at the supply measurement points can be used, among other things:

- to ensure the sufficient operating voltage of the devices to be supplied during operation, to determine the voltage drops across the supply lines,
- to continuously determine operating currents with known line resistances, wherein the line resistances can be determined, for example, in a test run via the voltage difference with a current source,
- to evaluate voltage drops over time, for example so as to identify peak loads or to detect deteriorating cable quality,
- to implement condition monitoring, i.e. continuous state monitoring of an electrical connection and/or data connection,
- to derive the health status of an entire installation of a system and plan maintenance intervals, and/or
- to locate fault sources quickly, especially by localizing a creeping cable fault or a cable failure.

In the automation industry, device plug connectors with pre-assembled cables are used to transmit signals and/or power for actuators and sensors. As an example, an M12 plug connector creates a connection to a device and the associated cables via a plurality of pins and corresponding cables. These connections are typically sealed to be waterproof and dustproof.

The connections are used, for example, to connect voltage sources to field devices and/or sensors and thus supply them with power. This is achieved according to a so-called star or daisy-chain distribution principle. In the first case, the devices to be supplied are each supplied by a supply line to the voltage source (logically star-shaped). In the second case, a first device is connected to the voltage source and further devices are connected to each other in a line through another supply line. This distribution principle can also be combined within an installation.

Field devices and sensors, for example, require an operating voltage for operation which, with tolerances, is approximately 24 V DC voltage, and each device calls up a certain power, i.e., a certain operating current, from the voltage source during operation.

A disadvantage of currently known solutions is that the voltage supply must be configured in advance on the basis of the existing power requirements. To do this, the user must know the power of the devices being operated and must design the voltage supply accordingly. The voltage supply must be able to supply the devices sufficiently, i.e., the sum of the operating powers must be provided, and the operating voltage must be offered at all devices within the required tolerance limits. However, the operating voltage reduces in the installation as a function of the currents and the cable lengths. The operating currents of the devices, in turn, depend on the level of DC voltage provided at the device.

The electrical plug connector of the invention can be used, for example, in a power supply in industrial production or logistics. Furthermore, various applications in automation and manufacturing technology are conceivable, as well as in the automotive sector or other technical fields where a high safety standard and great reliability must be ensured.

The electrical plug connector therefore advantageously allows a weak point in a voltage supply or in a supply network to be identified, especially before a fault occurs. Furthermore, a particularly fast diagnosis via the point of failure can be ensured, for example in the event of a cable break. Furthermore, a particularly demand-oriented installation and commissioning can be achieved. In this way, for example, downtime of a warehouse or an installation can be avoided. If necessary, the time required for troubleshooting is reduced. In addition, overdimensioning of a supply system can be avoided.

The electrical plug connector can be formed in various ways. It is not limited to connectors that can be connected by pure plugging, but other connectors are also included. It can be provided here that the input-side contacts can be at least partially connected to a complementary plug by a plug-in process. In particular, input-side contacts can be formed in different ways, for example based on existing standards and norms. For example, the plug connector can be used to implement a screw connection in accordance with IP67, for example with various M12 codings, a ⅞" connection or a connection in accordance with "M12 Power" for high power requirements.

The electrical plug connector ensures a power supply with the desired quality, especially with regard to the power requirements in a supply network. The accuracy to be achieved may depend on the particular infrastructure or technical context, for example when the plug connector is used in a 12V environment.

For example, input and/or output voltages can be determined for the plug connector, for example by measuring a current strength, and a voltage difference between plug connectors can thus be calculated. In particular, a voltage drop is detected in this way. Furthermore, a cable temperature can be detected, which can be an indication of the temperature-dependent electrical resistance of the connection, for example.

Furthermore, monitoring of the state of the cable can be implemented, for example to identify a damaged cable.

For example, a microcontroller and/or a memory unit and/or a voltage supply circuit can be integrated directly into the plug connector. Furthermore, a measuring system for a voltage can be provided, for example at a supply pin. The communication interface can further be implemented in a wired manner or wirelessly, for example by means of a radio transmission such as Bluetooth.

The at least one output-side contact can be formed in various ways known per se. A plurality of output-side contacts can be provided, which can also be formed differently; in particular, at least one output-side contact can be suitable for establishing an electrical connection for power transmission and at least one output-side contact can be suitable for establishing a data connection.

The at least one output-side contact can be formed in such a way that a cable or a line can be connected thereto; the connection can be permanently formed here, for example in the case of a soldered or welded connection, or a detachable connection can be made, for example by means of clamps, screws or in another manner known per se for connecting a cable. In one embodiment, a cable or a line is connected to the output-side contact. In particular, a cable having a plurality of lines is provided, wherein a line is connected to each of a plurality of output-side contacts of the electrical plug connector. In a further embodiment, the output-side contact may comprise a contact face for establishing an optical data connection, in particular for connecting an optical line.

The at least one input-side contact can be formed in various ways known per se. A plurality of input-side contacts can be provided, which can also be formed differently; in particular, at least one input-side contact can be suitable for establishing an electrical connection for power transmission and at least one input-side contact can be suitable for establishing a data connection.

In particular, the at least one input-side contact is formed such that a complementary plug connector can be connected. For this purpose, the input-side contact can comprise a pin or a socket, for example, and it can further be formed as a contact face. In a further embodiment, the input-side contact can comprise a contact face for establishing an optical data connection.

In another embodiment, the electrical circuit is at least partially arranged externally on the housing of the electrical plug connector.

The detected operating parameter can be, for example, a value that is assigned to the plug connector and/or a cable or line connected thereto and/or a connected further unit. In particular, the operating parameter is selected to represent a characteristic of a power and/or data transmission.

The operating parameter can be constituted by different variables, for example voltage and/or current. Furthermore, other variables can be detected as operating parameters, such as a capacitance, inductance, resistance, impedance, frequency, a thermal property and/or other line characteristics.

The detection is carried out in particular in a manner known per se, for example by a sensor element for measuring a current strength or a voltage. The operating parameter can be detected, for example, between input-side and output-side contacts, for example by a series-connected sensor element of the sensor device. In this case, the measurement can be performed when a connection exists between an input-side contact and an output-side contact. Furthermore, a measurement of the electrical operating parameter can take place between different connections, each of which exists between input-side and output-side contacts assigned to the connection. For example, this can be used to measure potential differences between two electrical lines connected to the plug connector.

In one embodiment, the sensor device and the control device are arranged on a common carrier body, and the carrier body is formed as a circuit carrier injection-molded from plastic, on which metallic conductor tracks are applied. The carrier body and/or at least part of the electrical circuit can be produced by means of a 3D printing process or by means of additive manufacturing. Alternatively or additionally, an injection molding process can be used to produce the housing and a carrier body optionally connected thereto.

In one embodiment, the control device is designed to generate memory data on the basis of the detected operating parameter and to store said data by means of a memory device. The memory data can, for example, have a specific data format.

Advantageously, this means that the data can be provided in a particularly flexible manner and historical data can be evaluated. In particular, a development of the detected operating parameter over time can be determined.

In this case, the memory device is integrated into the electrical plug connector in particular and, for example, is comprised by the electrical circuit arranged in the housing.

The output can be achieved in various ways. For example, the output can be generated and output automatically, such as at regular intervals, such as time intervals or depending on the number of times a unit is put into operation, or the output can be made on demand, such as when a demand signal is detected, for example when a corresponding signal is received from an external unit.

In a further embodiment, the control device is designed to output the output data automatically and/or upon receipt of a request signal.

Advantageously, this allows particularly flexible access to the detected data.

The output can take place at regular time intervals, for example. It can further be triggered automatically by certain events, an overshoot/undershoot of a threshold value for the detected operating parameter, or in some other way. A request signal can be generated and received by the control device in various ways, in particular via the communication interface. The request signal can be digital, for example, but it can also comprise an analog signal, such as an actuation of a switch or a receipt of a specific analog data signal.

In a development, the operating parameter detected or determined comprises a voltage, a current strength, a field strength, a resistance, an impedance, an inductance, a capacitance, a temperature, and/or a humidity value.

Advantageously, this allows particularly relevant parameters of the operation to be detected.

For example, the sensor device can be designed to detect a temperature and humidity.

The detected electrical operating parameter can be, for example, a value that is assigned to the plug connector and/or a cable or a line connected thereto and/or a connected further unit. In particular, the operating parameter is selected to represent a characteristic of a power and/or data transmission.

The operating parameter can be constituted by various variables, for example voltage and/or current. Furthermore, other variables can be detected as operating parameters, such as a capacitance, inductance, resistance, impedance, frequency, a thermal property, and/or other line characteristics. A field strength can be detected, for example, by means of a Hall sensor.

For example, a cable can be connected to the plug connector, in particular to the output-side contact of the electrical plug connector.

In one embodiment, a cable is connected to two electrical plug connectors of the invention, wherein the cable has, in particular, a first end connected to the output-side contact of a first plug connector and a second end connected to an output-side contact of a second plug connector.

When the electrical operating parameter is detected, for example, a differential voltage between the plug connectors can be determined, in particular calculated according to the formula $U_{diff}=U_1-U_2$, wherein $U_{diff}$ denotes the differential voltage, and $U_1$ and $U_2$ denote the voltages measured at the first and second plug connectors, respectively.

When detecting the electrical operating parameter, for example, a line resistance between the ends of the cable, in particular the resistance between the first and second plug connectors, can be determined.

Such a measurement can be used, for example, to identify broken lines and/or to identify short-term interruptions in the conductivity of the cable, such as in the case of a loose contact.

Furthermore, an insulation resistance between conductors connected to the plug connector can be detected as an operating parameter.

Furthermore, a current strength through individual conductors connected to the plug connector can be detected as an operating parameter.

For example, the current can be measured indirectly via an electric or magnetic field around the conductor. In particular, a field sensor, a current sensor, a Hall sensor and/or another sensor circuit is used here.

It can be provided that the detected operating parameter, such as a measured voltage or current, and/or a value determined on the basis of the operating parameter is transmitted by means of the communication interface via wired or wireless communication. The output data are output and/or can be retrieved externally.

In one embodiment, the output can be output in a wired manner and/or wirelessly by means of the communication interface. The communication interface can be formed here as a radio interface or can comprise such an interface.

Advantageously, this makes it particularly easy to retrieve the output.

Methods known per se can be used, such as Bluetooth, 5G, RFID, a near-field communication technique and/or WLAN/LAN. The communication interface can be comprised of a telecommunication module, for example. Furthermore, an antenna element can be provided, which is used to transmit and/or receive electromagnetic waves for a data connection.

In the case of a wired output, methods known per se can be used, for example to provide data via a line to the electrical supply, wherein a modulation of a voltage value takes place to transmit the transmitted data.

In a further embodiment, the electrical circuit further comprises a memory device designed to store detected operating parameters and/or output data, wherein data stored by the memory device are readable via the communication interface.

This, advantageously, makes it particularly easy to evaluate data from the past. In particular, there is no need for constant output, but it can be sufficient to retrieve or output the memory data only on certain occasions of the evaluation.

The stored data can be determined, for example, on the basis of the detected operating parameter within a specific time interval, that is to say, the memory data can relate to the values of the operating parameter detected within the time interval and/or can be stored for a specific time interval. Furthermore, storage can be triggered by a predetermined event, such as an external control signal, the occurrence of an error, a value exceeding or undershooting a limit value, or upon a certain change in time of the detected operating parameter. For example, storage can be triggered when a rapid change or deterioration of the detected operating parameter or a value derived therefrom is determined.

The memory data can furthermore be generated and stored according to the principle of a ring memory. It can be provided here that the value of the detected operating parameter and/or a value determined on the basis thereof is always stored for a certain past period of time and is then discarded again. When a certain event occurs, such as an external control signal, the occurrence of an error, a limit value being exceeded or not reached, or a certain change over time in the recorded operating parameter, the data stored in the ring buffer can be accessed and the development of the operating parameter over a defined period is available for evaluation.

A time interval can be defined here in such a way that it denotes the expiration of a certain period of time; however, it can also denote a certain number of predetermined events, such as switching operations or the like.

In a development, a cable is further provided which is connected to the at least one output-side contact. Here, the cable has a cable parameter, wherein a value of the cable parameter is stored at the memory device. The cable parameter may comprise, for example, a length, a resistance, a maximum value for current strength, voltage and/or power, an inductance, a capacitance, a thermal value, a material property or a type designation.

This advantageously provides data of the connected cable, which are often constant and are provided by simple measurement methods already advantageously integrated in the manufacturing process and/or are provided after a one-time measurement. This enables a more comprehensive evaluation of the recorded operating parameter.

The cable can be formed in various ways known per se. In particular, it is suitable for the conduction or transmission of electrical power, current, voltage, signals and/or optical signals. In particular, a cable can comprise a plurality of lines, which can be formed equivalently or for different transmission modes.

The memory device can be used, for example, to store information about the plug connector and/or a connected cable.

For example, a line length of a pre-assembled cable can be stored. In this case, the length of the cable is already known and this information can therefore be provided for the memory device directly during the production of the electrical plug connector with the cable.

For example, various production parameters and/or identification data can be stored about the plug connector and/or a connected cable. For example, a type designation can be stored.

For example, an electrical resistance of a line connected to the plug connector can be stored, wherein this resistance is measured in particular at the factory during production.

For example, a calibration step may be performed during the production of the plug connector with the cable connected, and the memory device can store calibration data; calibration data can be various values of parameters specific to the cable and/or plug connector that are relevant to the operation of the cable and/or plug connector and/or a supplied unit.

For example, the memory device can store an insulation resistance between individual conductors of a cable connected to the plug connector, wherein this insulation resistance can be measured in particular at the factory during production and/or at a later time and can be stored on the memory device.

For example, characteristic values for the development of the line resistance as a function of temperature can be stored on the memory device.

Furthermore, the stored cable parameter can be formed in such a way that it allows the determination of a further parameter. This further parameter then does not have to be detected directly. For example, a value of a thermal insulation of the cable can be stored and it can be determined during operation what temperature the cable has or how much heat it emits. In this way, an imminent overheating of the cable can be identified in good time.

Relationships between various cable parameters or between ambient parameters and cable parameters for the operation of the cable and/or the plug connector can be stored. For example, parameters relating to a current-carrying capacity of the connected lines can be stored on the memory device, in particular also as a function of temperature. For example, data of a characteristic curve can be stored, by means of which a load-bearing capacity can be determined on the basis of a detected temperature, such as a maximum permissible value of a power, voltage and/or current strength.

For example, data concerning a heat dissipation capability of a cable insulation of a cable connected to the plug connector can be stored on the memory device, wherein in particular data concerning a dependence of this heat dissipation capability on certain installation conditions can also be stored.

Furthermore, a possibility can be provided to subsequently store additional information on the memory device of the plug connector, in particular cable parameters. For example, the control device and the communication interface can be designed to provide a user interface by means of which the additional information can be detected, for example on the basis of a user input and/or on the basis of a signal received from an external unit.

Stored additional information may concern installation conditions that can influence the heat dissipation capacity. For example, the heat dissipation capacity may depend on whether a cable has been installed in an insulating material or whether a surrounding material is suitable for absorbing dissipated heat energy.

Furthermore, the additional information may concern an ambient temperature, for example, if this can be assumed to be a fixed value, such as when used in an air-conditioned hall or a cold store.

Furthermore, the additional information may concern, for example, an individual limit value for a current load, in particular in order to be able to specify line reserves available during use. The additional information may further concern information about parameters of the electromagnetic compatibility, for example in conjunction with features of a shielding.

The additional information may also concern, for example, individual limit values for the voltage that can be applied to a line and/or a cable. Furthermore, the additional information may concern other limit values for the line and/or the cable, such as a current strength.

The additional information may also concern, for example, identification data for the plug connector and/or a connected cable, such as a model or type designation, serial number, article number or the like.

Furthermore, automatic detection of additional data and storage thereof on the memory device may be provided by the control device, for example by a connection to a database or a predetermined data source.

In one embodiment, the electrical circuit further comprises a localization unit. In particular, the output data comprise localization information detected by means of the localization unit. Methods known per se can be used to localize the plug connector, for example by means of 5G or GPS technology or by means of other methods.

This can advantageously facilitate maintenance, as the source of a fault or alarm message can be easily identified if necessary.

The localization information is suitable for determining an arrangement of the plug connector and/or a cable connected thereto, in particular relative to a starting point, such as a central unit or a voltage source. For example, localization information is determined in a tightly meshed local 5G network relative to the positions of transmitting stations and by using methods such as time-of-flight and/or angle determination based on the radio signals.

Here, the localization information is associated with the electronics and communications unit of the plug connector; for example, it can be detected by means of the integrated localization unit or, in further embodiments, it can be provided in other ways, such as by being entered during installation of the plug connector. For example, localization information can be determined and stored relative to one or more reference positions. Further, the localization information can be formed descriptively, such as "next to another element X", "in cabinet Y", or otherwise by reference to other elements.

The localization information can be used, for example, to identify a topology of the lines or to determine a topology of an entire (voltage) supply network from the topology related to the individual lines. For example, a difference in the measured current strengths and/or voltages can be used to determine how much power is consumed by connected devices at individual node points, in particular also at distributor stations.

The electrical plug connector can be used, for example, for a condition monitoring process or for monitoring a cable connection. The cable connection can be designed for the transmission of data and/or electrical power.

For example, characteristic values can be calculated here and it can be checked whether defined alarm conditions are present. In particular, the detected operating parameter is compared with a defined threshold value and an alarm is output if the threshold value is exceeded or undershot.

A threshold value can be specified, by means of which an alarm condition is defined. The threshold value can also be determined dynamically, for example depending on the detected operating parameter and/or an ambient parameter, such as temperature, humidity or requirements of a connected device.

In this case, the processing of the detected operating parameter and the checking of the alarm condition can be performed by means of the electrical circuit of the plug connector.

Alternatively or additionally, processing can be performed by an external memory and/or calculation unit, wherein the presence of the alarm condition is checked. Such an external memory and/or calculation unit can, for example, be formed as a fieldbus device or controller.

For example, it can be identified if a detected current decreases suddenly or voltage drops occur on a connected line. This can indicate, for example, the failure of a fieldbus device connected downstream, a sensor or another connected device.

An evaluation of the line condition can be determined based on a development of the detected operating parameter over time. For example, a detected line resistance can be evaluated, for example to identify changes in the properties of a cable caused by progressive aging, by mechanical damage and/or by heating or cooling of the cable, for example when in contact with a liquid such as rain.

An assessment of the state of the cable can be determined based on a development of voltage drops over time. Here, too, changes in the properties of a cable can be identified, which are caused, for example, by aging, by mechanical damage or by heating or cooling of the cable, for example when it comes into contact with a liquid such as rain.

Communication can be established between the electrical plug connector of the invention and connected devices, such as a fieldbus device, a communication unit, such as a switch, a connected sensor, a power-supply unit or other devices. During communication, there is in particular a data connection between the plug connector and the device. Further, for the communication, the data connection can be established between the plug connector and an external unit and/or the data connection can be established between various attached and/or connected units via the plug connector.

In one example, it may be possible for a notification to be output by the plug connector, for example if the operation of a particular connected device would result in an overload of the line connected to the plug connector. The device can then be switched off, in particular automatically by an integrated or external control device. It can further be provided that, upon such notification of an impending overload, the device reduces its current consumption to a minimum, for example by switching off the I/Os, and outputs a message about the error condition that has occurred.

In another example, a notification of the load-bearing capacity of the cable can be transmitted to a power-supply unit. The power-supply unit can then reduce the output current strength or can perform a shutdown for safety or can trigger an alarm or the output of an alarm notification.

Furthermore, an indication of a current/voltage status can be provided on the plug connector itself, for example by means of an LED and/or other indicator device.

For example, a green glow of the LED can signal that voltage and current strength are within predefined limits. An orange or yellow glow of the LED can indicate an impending overload or impending overvoltage or undervoltage. A red glow of the LED can indicate that predetermined limit values have been exceeded. In other examples, a different type of output is provided.

In one embodiment, a communication protocol is provided by means of which a plurality of plug connectors communicate; the communication can be direct or can be mediated by a central unit, such as an external control unit or element comprised by an external control unit. For example, measured operating parameters can be compared here between various cables, in particular to identify a topology of the lines. For example, a difference in measured currents or current strengths can be determined. Subsequently, it can be determined how much power is consumed at the individual node points by connected devices. This allows a particularly simple and efficient monitoring of the devices and/or the cables.

In one embodiment, it can be provided that an alarm message is output when a critical state is determined, and the alarm message can comprise localization information. In particular, such localization information that is detected by means of a localization unit of a plug connector can be included.

In one embodiment, an identification of interference in a line and/or in the plug connector can be provided, in particular induced voltages, such as those due to external fields and caused, for example, by adjacent lines or electric motors.

In one embodiment, an identification of malfunctions of connected devices by an abnormal pattern of current consumption can be provided. For example, it can be identified here that the current consumption of a device changes over time, in particular abruptly, or an overshoot or undershoot of a predefined limit value can be identified. The identification can be advantageous, for example, for consumers that do not themselves have corresponding protection or diagnostic devices, for example to identify and/or diagnose a mechanically blocked electric motor or a defective heating element.

Methods from the field of machine learning or artificial intelligence can be used to evaluate the detected electrical operating parameter. In particular, irregular patterns of a power consumption are identified in this way. In this case, the evaluation can be performed by means of an external unit, for example. The machine learning method can be trained using historical values of the detected operating parameter.

Furthermore, it can be provided that a line is interrupted when a predetermined condition is met, such as exceeding or undershooting a predetermined limit value or a sudden change in the detected operating parameter. The interruption of the line can be carried out in the sense of a protective disconnection known per se, wherein, for example, the electrical circuit comprised by the electrical plug connector performs and/or triggers the interruption. For this purpose, a switch can be provided which is formed in a manner known per se, for example as a semiconductor element; alternatively or additionally, an electrical fuse can be provided.

Furthermore, the electronics in the plug connector can be protected against an, in particular short-term, interruption of the supply voltage. A buffer capacitor can be provided for this purpose, for example.

Furthermore, a fuse can be provided in the plug connector to protect the supply voltage of the electronics against an, in particular short-term, interruption of the supply voltage, for example in order to be able to generate and output an alarm message in the event of an interruption of the supply voltage.

The system comprises a cable having a first cable end and a second cable end, wherein the first and/or second cable ends are connected to an output-side contact of an electrical plug connector according to the present description.

This system uses the electrical plug connector of the invention and therefore has the same advantages as the electrical plug connector.

Furthermore, it can be provided that the first cable end is connected to a first electrical plug connector and the second cable end is connected to a second electrical plug connector according to the present description. Furthermore, it can be provided that a data connection exists between the first and the second electrical plug connector, via which the data detected and generated by means of the first and/or second plug connector, in particular the detected operating parameter, can be sent and/or received.

In the method for operating a system comprising an electrical plug connector, wherein the plug connector comprises a sensor device for detecting an electrical operating parameter, a comparison is performed between the detected operating parameter and a threshold value, and output data are generated and output depending on the result of the comparison. In particular, the comparison can be performed by a control device comprised by the electrical plug connector.

In particular, the plug connector is formed according to the present description. In particular, a first and a second plug connector can be provided, which are connected to a first and a second end of a cable, respectively, and are formed according to the present description.

The generation and/or output of the output data can be triggered based on a control signal. Such a control signal can be received from an external unit, for example.

In particular, the method is designed to operate the device. It therefore has the same advantages as the device according to the invention.

In particular, the presence of a condition is checked during the comparison between the detected operating parameter and the threshold value. Depending on whether and, if so, in what way the condition is fulfilled, the output data are generated.

The threshold for the comparison can be fixedly predefined or determined dynamically, for example during an iterative execution of the method.

In particular, a system-typical, for example time-dependent or predefined setpoint value and/or a value of the operating parameter detected in the past can be taken into account as a threshold value for the comparison.

Further, one or more threshold values can be considered in the comparison of the detected operating parameter and/or one or more operating parameters can be detected and considered in the comparison.

The comparison of the operating parameter with the threshold value can be performed in various ways: The detected operating parameter can be compared directly with a fixedly predefined or dynamically determined threshold value; the output data are then generated depending on whether the threshold value is exceeded or undershot.

Alternatively or additionally, a change in the detected operating parameter with time and/or with respect to another value can be determined and used in the comparison; the output data are then generated depending on how the change progresses. For example, a first, second, and/or third derivative of the detected operating parameter with respect to time and/or another variable can be used for comparison, for example to identify a rapid or sudden change that may indicate damage, or to identify a gradual change, such as wear or aging.

By means of the method, for example, a connection established by the plug connector for power and/or data transmission can be monitored. In particular, a network of a plurality of plug connectors and a voltage supply network implemented therewith can be organized according to a power requirement and/or anomalies can be identified. For example, a rapid change in electrical characteristics of a connected cable and/or a connected device can be detected based on the detected operating parameter.

Furthermore, depending on the result of the comparison, a reaction to an anomaly can be triggered, such as a shutdown, a control of a power consumption, an output of an alarm signal or a controlled shutdown of a component in the power supply network. The method can also be used to monitor the state of the supply network, in particular with regard to the performance of the components used.

BRIEF DESCRIPTION OF THE DRAWINGS

The invention is explained in more detail below with reference to the accompanying drawings, in which:

FIG. 1 shows an exemplary embodiment of the electrical plug connector; an

DETAILED DESCRIPTION

Figure 1:
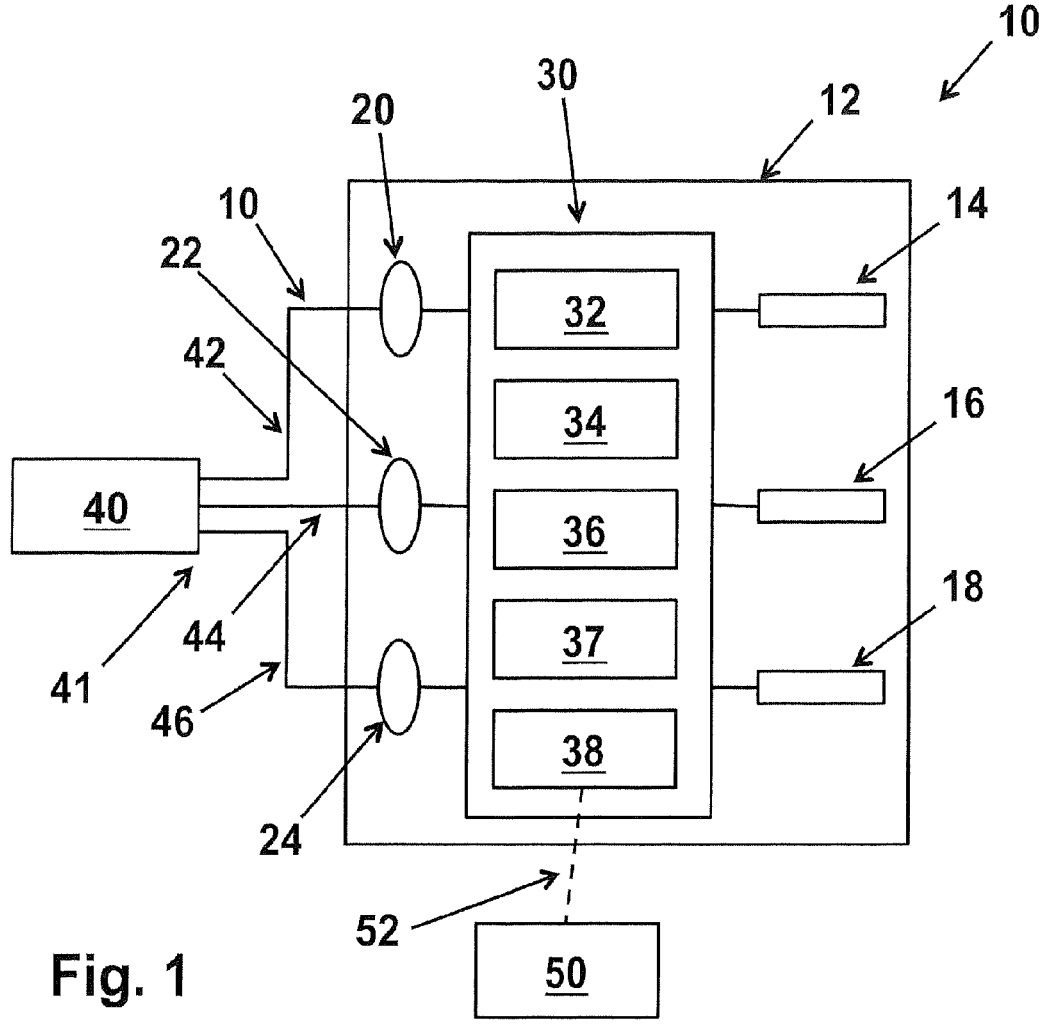

With reference to FIG. 1, an exemplary embodiment of the electrical plug connector is explained.

In the first exemplary embodiment, the electrical plug connector 10 has a housing 12 in which there are arranged input-side contacts 14, 16, 18 and output-side contacts 20, 22, 24.

The plug connector 10 further comprises an electrical circuit 30, which in this example is also disposed in the housing 12.

The plug connector 10 further comprises a sensor device 32, a control device 34, a memory device 36, a localization device 37, and a communication interface 38.

In further exemplary embodiments, other devices can be comprised, in particular some of these devices 32, 34, 36, 37, 38 can be absent and/or combined in other ways.

In the exemplary embodiment, the sensor device 32, the control device 34, the memory device 36, the localization device 37 and the communication interface 38 are comprised by the electrical circuit 30. In particular, they can be arranged on a circuit board and/or on a common component.

In further exemplary embodiments, the devices 32, 34, 36, 37, 38 are not, or not entirely, comprised by the electrical circuit 30. They can further be at least partially arranged outside the housing 12.

In the exemplary embodiment, each of the output-side contacts 20, 22, 24 is connected to a corresponding line 42, 44, 46 of a cable 40 connected to the plug connector 10. In the exemplary embodiment, these are electrical lines 42, 44, 46 for transmitting data and/or electrical power. In the exemplary embodiment, one end 41 of the cable 40 is connected to the plug connector 10.

The output-side contacts 20, 22, 24 are connected to the electrical circuit 30. These connections are shown only schematically in FIG. 1. Other circuits and connections can be provided, in particular parallel and/or series circuits.

The input-side contacts 14, 16, 18 are also connected to the electrical circuit 30. These connections are also shown only schematically in FIG. 1; other circuits and connections can also be provided here, in particular parallel and/or series circuits.

The plug connector 12 is designed to assign the lines 42, 44, 46 to the input-side contacts 14, 16, 18 in a manner known per se. For example, the cable 40 can be connected to a device (not shown) by means of the plug connector 10 and/or a plurality of cables 40 can be connected to each other.

In the exemplary embodiment, the lines 42, 44, 46 are electrically conductive and are designed to transmit electrical power and/or data signals.

In further exemplary embodiments, it can be provided that at least individual ones of the lines 42, 44, 46 are designed only for the transmission of either electrical power or electrical data signals. Furthermore, at least one line 42, 44, 46 can be designed for optical transmission of data, in particular a light guide or an optical fiber.

In the exemplary embodiment, the memory device 36 comprises a non-volatile data memory. This can be controlled by the control device 34 to store data there and/or to retrieve stored data. Data stored on the memory device 36 can further be edited and/or erased.

In the exemplary embodiment, it is further provided that a data connection 52 to an external unit 50 can be established at least temporarily via the communication interface 38. This connection can be established in various ways known per se, for example by means of Bluetooth, near-field communication/RFID, G5 or another mobile radio network, WLAN or via another standard, in particular via radio signal transmission.

In further exemplary embodiments, a wired data connection 52 can be established between the communication interface 38 and the external unit 50. In particular, it can also be provided that the data connection 52 can be established by means of at least one of the lines 42, 44, 46 connected to the output-side contacts 20, 22, 24; in particular, a signal for transmitting data can be superimposed on a current flow for transmitting power.

In the exemplary embodiment, it is further provided that the localization device 37 is suitable for detecting information regarding the localization of the plug connector 10. This can be done in various ways, such as by GPS, 5G, or by another method. The detected information about the localization of the plug connector 10 can relate to an absolute position within a coordinate system, for example a global coordinate system, or it can relate to a relative position relative to an initial position, for example relative to a central control unit.

In another exemplary embodiment, the plug connector 10 further comprises an output unit (not shown). This may, for example, be formed as a display unit and may comprise, for example, a display and/or a lighting element. For example, a light-emitting diode (LED) can be comprised, the lighting state of which can be controlled by the control device 34. In particular, a light parameter can be controlled, such as a brightness, a light color or a flashing frequency.

Figure 2:
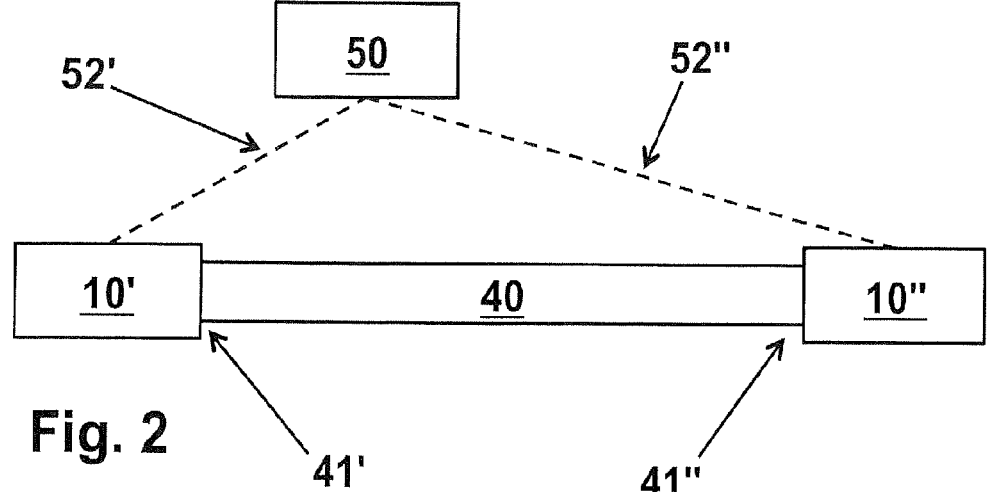
FIG. 2 shows an exemplary embodiment of the system.

With reference to FIG. 2, an exemplary embodiment of the system is explained. In particular, the exemplary embodiment of the electrical plug connector explained above is taken as a starting point.

In this exemplary embodiment, it is provided that the cable 40 is connected at a first end 41' to a first plug connector 10' and at a second end 41" to a second plug connector 10". The various plug connectors 10', 10" and their connections to the cable 40 are formed substantially as described above with reference to FIG. 1. From the two plug connectors 10', 10", data connections 51', 52" to the external unit 50 can also be established.

With reference to FIG. 1 and FIG. 2, an example of the method is explained. In particular, the above explanations with reference to FIG. 1 and FIG. 2 are taken as a starting point.

In the exemplary embodiment of the method, when the cable 40 is used to transmit electrical power and/or data, an electrical operating parameter is detected by means of the sensor device 32.

In the exemplary embodiment, the detected operating parameter comprises a voltage, a current strength, a resistance, an impedance, an inductance, a capacitance, a temperature, and/or a humidity value.

In the exemplary embodiment, the detected electrical operating parameter comprises a voltage and a current strength that are transmitted via the cable 40 or that are measured via the second two lines 42, 44, 46 of the cable 40, respectively.

In the exemplary embodiment, the control device 34 generates output data based on the detected operating parameter. These output data are then output using the communication interface 38, wherein said data are transmitted to the external unit 50 in this exemplary embodiment.

Here, in the exemplary embodiment, it is provided that a so-called "condition monitoring" is carried out by means of these output data, i.e. a monitoring of the state of the cable 40, its lines 42, 44, 46, the plug connectors 10, 10', 10" and/or the entire system. The output data are therefore generated in such a way that parameters of the system and/or its individual elements that are relevant for the transmission of power and/or data can be continuously monitored.

In the example, it is monitored in particular whether a detected operating parameter exceeds or undershoots a predetermined limit value. If such an event is detected, for example an unexpected voltage drop, an alarm signal is output and transmitted to the external unit 50. This can then generate a control signal by means of which a protective measure is initiated, such as a shutdown of a unit that could be damaged by the occurrence of the voltage drop.

Different events can be defined, for which an alarm or warning signal is triggered and different measures can be triggered.

For example, a gradual or sudden change in the line characteristics can be detected, such as when the cable 40 is damaged, when certain external conditions occur, such as a certain temperature, or when a change occurs due to aging.

In the exemplary embodiment, the control device 34 is designed to generate memory data on the basis of the detected operating parameter and to store these data by means of the memory device 36. The memory data are formed here in such a way that the detected operating parameter is stored over a certain period of time and can be retrieved. This makes it possible to track and evaluate the development of the operating parameter over time, for example to determine how quickly the operating parameter changes and/or when/how often certain events occur, such as deviations from a threshold value.

In the exemplary embodiment, the memory device 36 stores detected operating parameters and/or output data. In this case, data stored by the memory device 36 are readable via the communication interface 38.

In the exemplary embodiment, the output data are further output automatically, for example at regular intervals or after the occurrence of certain events, and/or in response to receiving a request signal, in particular by transmitting it to the external unit 50. In the exemplary embodiment, such a request signal is generated in particular by the external unit 50 and transmitted to the plug connector 10 via the data connection.

In the exemplary embodiment, the output data can be output wirelessly by means of the communication interface 38. Alternatively or additionally, in further exemplary embodiments, a wired output can be provided, for example via a line 42, 44, 46 of the connected cable 40.

In the exemplary embodiment, the cable 40 further has a cable parameter and this is stored at the memory device 36. For example, a length, an electrical resistance, a maximum value for current strength, voltage, and/or power, an inductance, a capacitance, a thermal value, a material property, and/or a type designation for the cable 40 and/or individual wires 42, 44, 46 can be stored on the memory device 36.

This makes it easier to determine further values based on the detected operating parameter, such as a heating of the cable 40, and it can be ensured that certain specific limit values are not exceeded or undershot.

For example, the cable parameters can be determined by measurement during production of the cable and/or the plug connector. Further, a calibration step can be provided in which the cable parameters are stored on the memory device 36.

In the present exemplary embodiment, it is provided that the cable parameters are stored on the memory device 36 in a manner substantially unchangeable by the user.

In further exemplary embodiments, it is provided that the cable parameters can be at least partially changed subsequently, wherein, for example, the control device 34 provides an operator interface which can be accessed via the data connection 52', 52" and which allows a corresponding input. In this context, an authentication step can further be provided to ensure an authorization of the user for a corresponding write access to the memory device 36.

In the exemplary embodiment, the output data comprise localization information detected by means of the localization unit 37. In the example, the localization information is formed so that when an alarm or warning signal is output, when the cable 40 fails, or due to other prompts, the cable 40 and/or the plug connector 10, 10', 10" can be easily localized, for example, to perform repairs.

LIST OF REFERENCE SIGNS

10, 10', 10" plug connector
12 housing
14 input-side contact
16 input-side contact
18 input-side contact
20 output-side contact
22 output-side contact
24 output-side contact
30 circuit
32 sensor device
34 control device
36 memory device
37 localization device
38 communication interface
40 cable
41', 41" cable end
42 line
44 line
46 line
50 external unit
52, 52', 52" data connection

The invention claimed is:

1. A system comprising:
an electrical plug connector (10) including:
   a housing (12),
   at least one input-side contact (14, 16, 18),
   at least one output-side contact (20, 22, 24), and an electrical circuit (30) arranged inside the housing (12), the electrical circuit (30) has a sensor (32), a controller (34), a memory (36), and a communication interface (38),
   the sensor (32) is configured to detect an electrical operating parameter; the controller (34) is configured to generate output data based on the electrical operating parameter and to output said data by a communication interface (38); and
   a cable (40) having a first cable end (41') and a second cable end (41"), at least one of the first (41') cable end or the second cable end (41") is connected to the output-side contact (20, 22, 24) of the electrical plug connector (10), and a value of a cable parameter of said cable (40), identification data for at least one of the plug connector (10) or the connected cable (40), and additional information directed to at least one of installation conditions that influence a heat dissipation capacity, or ambient temperature parameters of electromagnetic compatibility are stored in the memory (36).

2. The system as claimed in claim 1, wherein at least one of production parameters or identification data about the cable (40) connected to the plug connector (10) are stored in the memory (36).

3. The system as claimed in claim 1, wherein the memory is configured to store an insulation resistance between individual conductors of the cable (40), and said insulation resistance is measured at least one of during production or at a later time.

4. The system as claimed in claim 1, wherein the cable (40) is configured for conducting or transmitting at least one of electrical power, current, voltage, signals or optical signals.

5. The system as claimed in claim 1, wherein the cable (40) comprises a plurality of lines, which are formed equivalently or for different transmission modes.

6. The system as claimed in claim 1, wherein parameters relating to a load-bearing capacity of the connected cable (40) are stored in the memory (36).

7. The system as claimed in claim 6, wherein data of a characteristic curve are stored in the memory (36), in order to determine a load-bearing capacity of the connected cable (40) based on a detected temperature.

8. The system as claimed in claim 1, wherein data concerning a heat dissipation capability of a cable insulation of the cable (40) connected to the plug connector (10) are stored on the memory (36).

9. The system as claimed in claim 1, wherein additional information is stored on the memory (36) directed to at least one of installation conditions that influence a heat dissipation capacity, an ambient temperature parameters of electromagnetic compatibility, or identification data for at least one of the plug connector (10) or the connected cable (40).

10. The system as claimed in claim 1, wherein additional information is stored on the memory (36) directed to individual limit values of the cable (40).

11. The system as claimed in claim 1, wherein a threshold value is stored on the memory (36) in order to compare detected operating parameters with the threshold value and to output an alarm if the threshold value is exceeded or undershot.

12. The system as claimed in claim 1, wherein the sensor (32) is configured to at least one of detect an insulation resistance between conductors connected to the plug connector (10) as an electrical operating parameter or determine a line resistance between the ends (41', 41") of the cable (40) as an electrical operating parameter.

13. The system as claimed in claim 1, wherein at least one of the at least one input-side contact (14, 16, 18) or the at least one output-side contact (20, 22, 24) are configured to measure continuously at least one of voltages or current strengths in order to at least one of communicate or store for later output detected values thereof for continuous state monitoring of at least one of an electrical connection or data connection, to detect a deteriorating cable quality.

14. The system as claimed in claim 1, wherein a plurality of the electrical plug connectors (10) are provided, which communicate with one another directly or indirectly by an external controller (50) or indirectly by an element that is comprised by the external controller (50).

15. The system as claimed in claim 1, wherein the controller (34) of the electrical plug connector (10) is configured to generate output data based on detected operating parameters, and the communication interface (38) is designed to transmit the output data to an external controller (50).

16. The system as claimed in claim 1, wherein the controller (34) is configured to generate memory data based on the detected electrical operating parameter and to store said memory data on the memory (36).

17. The system as claimed in claim 1, wherein the memory (36) is configured to store at least one of detected electrical operating parameters or output data; and data stored by the memory (36) is readable via the communication interface (38).

18. The system as claimed in claim 1, wherein at least one of a) characteristic values relating to a line resistance of the cable depending on a temperature are stored on the memory (36), or b) data of a characteristic curve by which a load-bearing capacity of the cable is determinable based on a detected temperature is stored on the memory.

19. The system as claimed in claim 1, wherein cable parameters that allow determination of a further cable parameter are stored on the memory (36).

*     *     *     *     *